(12) United States Patent
Borg

(10) Patent No.: US 7,222,385 B1
(45) Date of Patent: May 29, 2007

(54) PORTABLE AND REMOVABLE WINDSHIELD WIPER

(76) Inventor: Howard Borg, P.O. Box 400, Bismarck, ND (US) 58502

( * ) Notice: Subject to any disclaimer, the term of this patent is extended or adjusted under 35 U.S.C. 154(b) by 0 days.

(21) Appl. No.: 11/289,588

(22) Filed: Nov. 30, 2005

(51) Int. Cl.
  *B60S 1/14* (2006.01)
  *B60S 1/34* (2006.01)
  *B60S 1/36* (2006.01)

(52) U.S. Cl. ............. 15/250.3; 15/250.31; 15/250.351; 15/250.352

(58) Field of Classification Search ............ 15/250.15, 15/250.3, 250.16, 250.351, 250.352, 250.31; 24/483, 486, 502; 248/231.71
See application file for complete search history.

(56) References Cited

U.S. PATENT DOCUMENTS

| | | | | |
|---|---|---|---|---|
| 437,181 A | * | 9/1890 | Doring | 54/15 |
| 756,723 A | * | 4/1904 | Skoog | 223/107 |
| 826,294 A | * | 7/1906 | Waldschmidt | 248/310 |
| 1,027,359 A | * | 5/1912 | Schorndorfer | 15/250.3 |
| 1,099,143 A | * | 6/1914 | Tracy | 15/250.3 |
| 1,158,590 A | * | 11/1915 | Tracy | 15/250.202 |
| 1,253,377 A | * | 1/1918 | Hicks et al. | 15/250.3 |
| 1,362,175 A | * | 12/1920 | Oishei | 15/250.3 |
| 1,414,578 A | * | 5/1922 | Oatman et al. | 15/250.31 |
| 1,445,473 A | * | 2/1923 | Beagle | 15/250.3 |
| 1,456,316 A | * | 5/1923 | Kritz | 15/250.3 |
| 1,506,132 A | * | 8/1924 | Oishei | 15/250.3 |
| 1,510,509 A | * | 10/1924 | Stadeker | 15/250.3 |
| 1,573,618 A | * | 2/1926 | Laganke | 15/250.351 |
| 1,602,457 A | * | 10/1926 | Ritzwoller | 15/250.28 |
| 1,658,389 A | * | 2/1928 | Oishei | 15/250.3 |
| 1,796,223 A | * | 3/1931 | Strang | 15/250.3 |
| 3,139,644 A | * | 7/1964 | Smith | 15/250.3 |
| 3,535,508 A | * | 10/1970 | Warshauer | 362/396 |
| 3,934,316 A | * | 1/1976 | Driscoll | 24/486 |

* cited by examiner

Primary Examiner—Gary K. Graham

(57) ABSTRACT

A removable and portable manually operated windshield wiper assembly that attaches to the top side of a window or window frame of a boat, tractor, atv and the like not otherwise so equipped which can be easily operated by the simple rotation of a handle.

10 Claims, 4 Drawing Sheets

PORTABLE AND REMOVABLE WINDSHIELD WIPER

| Index of Elements for Windshield Wiper Assembly ENVIRONMENTAL ELEMENTS | |
|---|---|
| 20 | Wiper Assembly |
| 22 | Clamp Assembly |
| 24 | First Side Segment |
| 26 | Second Side Segment |
| 28 | Intermediate Frame Segment |
| 30 | |
| 32 | |
| 34 | Seat Pad |
| 36 | |
| 38 | Clamp Cylinder |
| 40 | Cylinder Handle |
| 42 | Clamp Nut |
| 44 | Clamp Nut Spring Pad |
| 46 | Cylindrical Opening |
| 48 | Horizontal Tubing |
| 50 | First Open End |
| 52 | Second Open End |
| 54 | Cylindrical Rod |
| 56 | Rod Handle |
| 58 | Vertical Cylindrical Rod |
| 60 | Vertical Tubing |
| 62 | Set Screw |
| 64 | Circular Opening |
| 66 | First Spring Retainer |
| 68 | Wiper Arm |
| 70 | U Shaped Notch |
| 72 | Holding Pin |
| 74 | Spring |
| 76 | Second Spring Retainer |
| 78 | Wiper Blade |

BACKGROUND OF THE INVENTION

1. Field of the Invention

The present invention relates generally to a portable and removable manually operated windshield wiper which can be easily clamped on to the windshield of a boat, tractor, atv o the like for safely, simply and quickly removing water or debris from a windshield.

When operating a small fishing boat, pontoon or pleasure boat, water will often times splash onto the boats windshield, thereby obstructing the operator's view. Small fishing boats and other pleasure craft typically do not come from the manufacturer with a windshield wiper. Thus, the pleasure craft operator is required to clean off the windshield by either stopping the boat or attempting to clean the windshield while also operating the boat. If the weather is inclement, it may be dangerous or, at the very least, inconvenient to stop the boat to clean the windshield. On the other hand, cleaning the windshield while also operating the boat is dangerous and could result in boats colliding or the boat hitting an object in the water. Hence, there is a significant need for a portable and removable windshield wiper that can be easily attached to the windshield of a boat thereby allowing the boat operator to safely clean the boat windshield.

2. Description of the Prior Art

The prior art portable and removable windshield wipers have focused almost exclusively for use on automobiles. While these prior art portable and removable windshield wipers are effective for use on an automobile, they are not able to be easily used on a boat, tractor, atv or the like. An example of a prior art portable and removable windshield wiper includes U.S. Pat. No. 4,316,303 to Penn which discloses the use of magnets or suction cups to attach the portable and removable windshield wiper to the metal surface of an automobile. However, the windshield of a boat or tractor typically lacks the requisite metal surface for the use of a magnetically attaching portable and removable windshield wiper. The use of suction cups creates the possibility of the cups losing their suction resulting in the entire assembly coming off of the windshield.

While the prior art portable and removable windshield wipers may be suitable for the particular purpose to which they address, they are not as suitable for use on a boat, tractor or atv. In these respects, the portable and removable windshield wiper assembly according to the present invention substantially departs from the conventional concepts and designs of the prior art, and in so doing provides an apparatus primarily developed for the purpose of safely, simply and easily cleaning the windshield of a boat, tractor or atv.

SUMMARY OF THE INVENTION

In view of the foregoing disadvantages inherent in the known types of portable and removable windshield wiper assemblies now present in the prior art, the present invention provides a new portable and removable windshield wiper assembly wherein the same can be utilized for safely and easily cleaning the windshield of a boat, tractor or atv.

The general purpose of the present invention, which will be described subsequently in greater detail, is to provide a new portable and removable windshield wiper which has many of the advantages of the portable and removable windshield wipers mentioned heretofore and many novel features that result in a new portable and removable windshield wiper which is not anticipated, rendered obvious, suggested, or even implied by any of the prior art portable and removable windshield wipers, either alone or in any combination thereof.

To attain this, the present invention generally comprises a clamp assembly with a set screw which clamp securely attaches to the top side of the window or window frame of a boat windshield. A horizontal section of tubing is fixedly attached within a cylindrical opening of the clamp. Contained within the tubing is a horizontal rod. Fixedly attached to the first end of the horizontal rod is a handle for manually operating the windshield wiper. Attached to the second end of the horizontal rod is the first end of a vertical rod. The vertical rod extending below the first end is contained within a section of vertical tubing. The vertical tubing can be moved up or down the vertical rod thereby allowing the user to adjust the placement of the windshield wiper on the windshield. The vertical tubing, when in its proper location, is temporarily attached to the vertical rod with a set screw. Attached to the second end of the vertical tubing by means of a pin and spring is a wiper arm. Attached to the opposite end of the wiper arm is a wiper blade.

There has thus been outlined, rather broadly, the more important features of the present invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide an portable and removable manually operated windshield wiper that will overcome the shortcomings of the prior art devices.

Another object of the present invention is to provide a portable and removable manually operated windshield wiper that can be easily used on the windshield of a boat, tractor, atv or the like.

An additional object of the present invention is to provide a portable and removable manually operated windshield wiper that is easily operated from the driver's seat by the simple movement of a handle.

A further object of the present invention is to provide a portable and removable manually operated windshield wiper that can be easily removed from windshield and attached to a different windshield.

A further object of the present invention is to provide a portable and removable manually operated windshield wiper which securely attaches to a window or window frame.

Another object of the present invention is to provide a portable and removable manually operated windshield wiper that is inexpensive to manufacture and, therefore, inexpensive to the consumer.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

DESCRIPTION OF THE PREFERRED EMBODIMENT

Figure 1:
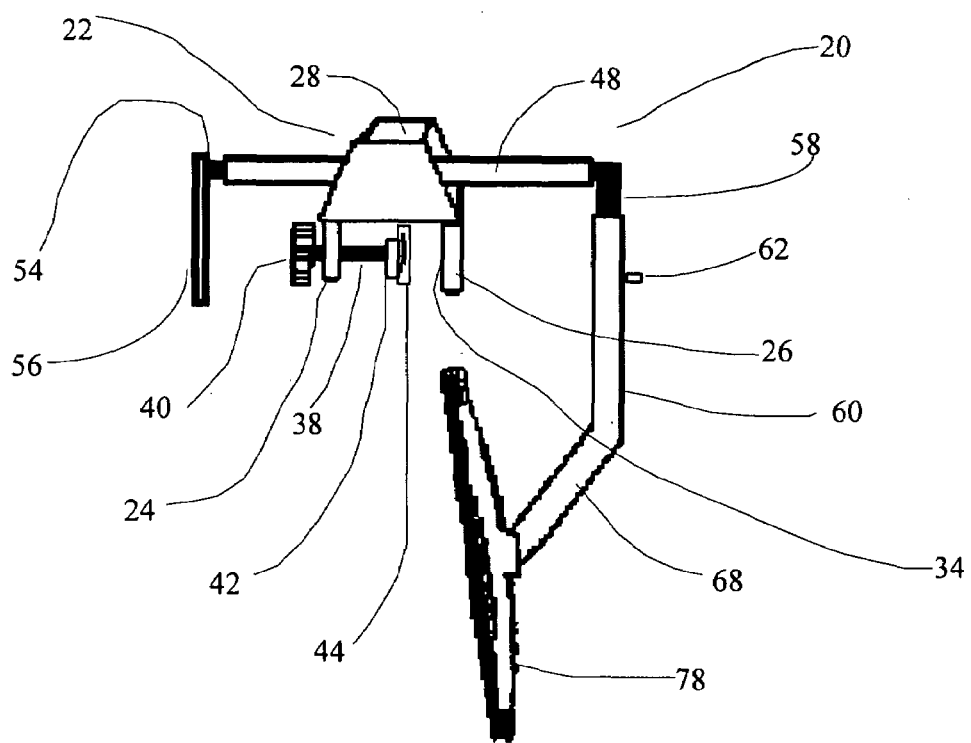
FIG. 1 is a side perspective view of the portable and removable windshield wiper assembly.
Figure 2:
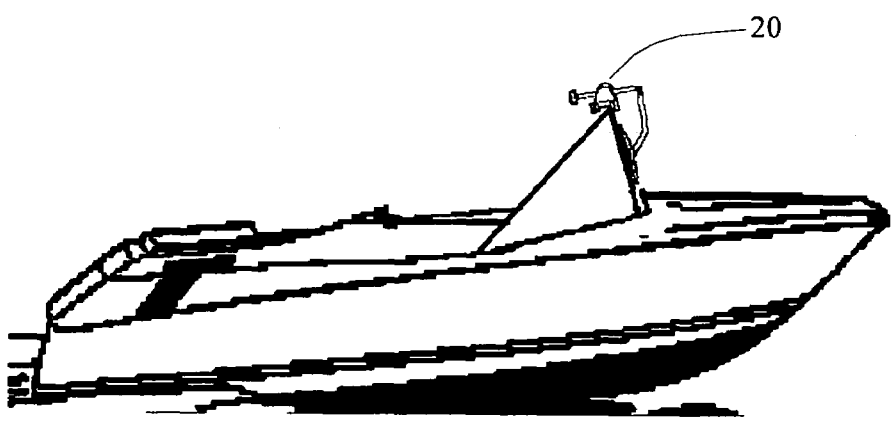
FIG. 2 is a side perspective view of pleasure craft with the portable and removable windshield wiper assembly attached to the front windshield.

Turning now descriptively to the drawings, in which similar reference characters denote similar elements throughout the several views, illustrate a portable and removable manually operated windshield wiper assembly 20, which comprises a clamp assembly 22.

Figure 5:
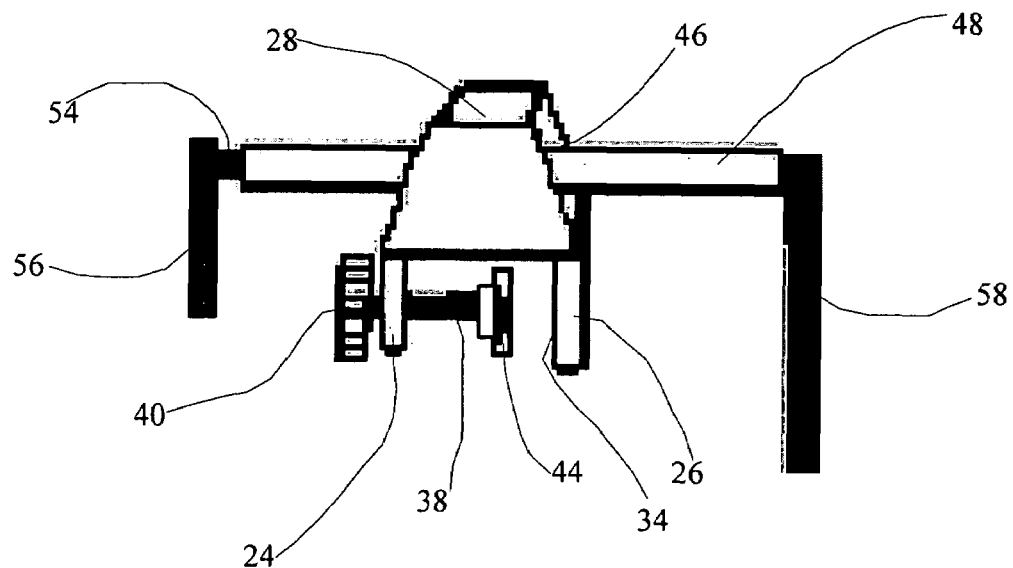
FIG. 5 is a side perspective view of the clamping assembly and the inclusion of the horizontal tubing within the clamping assembly.

Referring to FIGS. 1 and 5, the clamp assembly 22 is comprised of a first side segment 24 and a second side segment 26, spanned by an intermediate frame segment 28. A seat pad 34 is mounted on the second side segment 26 in facing relationship to the first side segment 24. A threaded clamp cylinder 38 is threaded into engagement with corresponding internal threads (not illustrated) of a cylinder opening (also not illustrated), provided in the first side segment 24.

Attached to the first end of the clamp cylinder 38 is a cylindrical shaped cylinder grip 40 to facilitate rotation of the clamp cylinder 38. Attached to the second end of the clamp cylinder 38 is a clamp nut 42, having corresponding internal clamp nut threads (not illustrated). Fixedly attached to the clamp nut 42 is a clamp nut spring pad 44.

The intermediate frame segment 28 is trapezoidal shaped with a horizontal cylindrical opening 46 passing through the intermediate frame segment 28. The horizontal cylindrical opening 46 is parallel to the clamp cylinder 38.

Fixedly maintained within the horizontal cylindrical opening 46 is a section of horizontal tubing 48 having a first open end 50 and a second open end 52. Inserted into the horizontal tubing 48 and extending beyond the first open end 50 and second open end 52 of the horizontal tubing 48 is a cylindrical rod 54. Fixedly attached to the first end of the cylindrical rod 54 is vertical rod-shaped handle 56 to facilitate rotation of the cylindrical rod 54.

Figure 3:
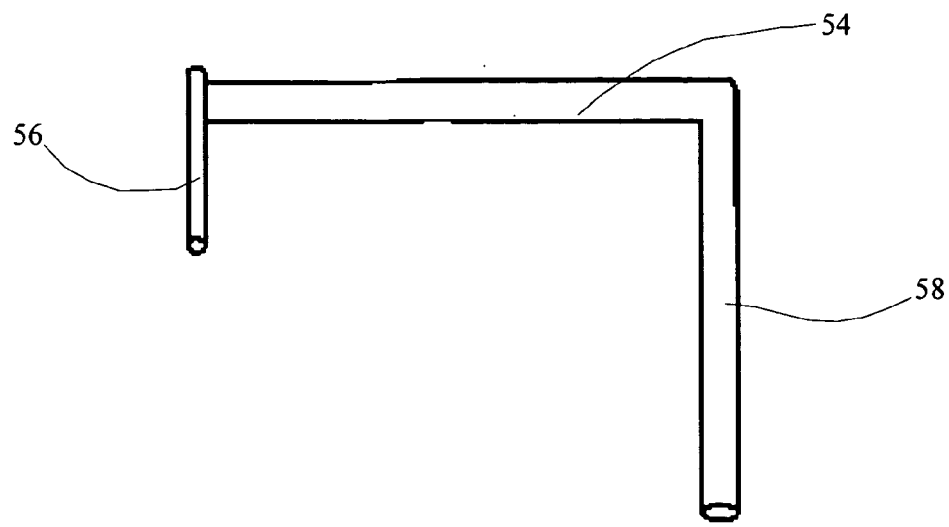
FIG. 3 is a side perspective view of the rod handle, horizontal cylindrical rod and vertical cylindrical rod.
Figure 4:
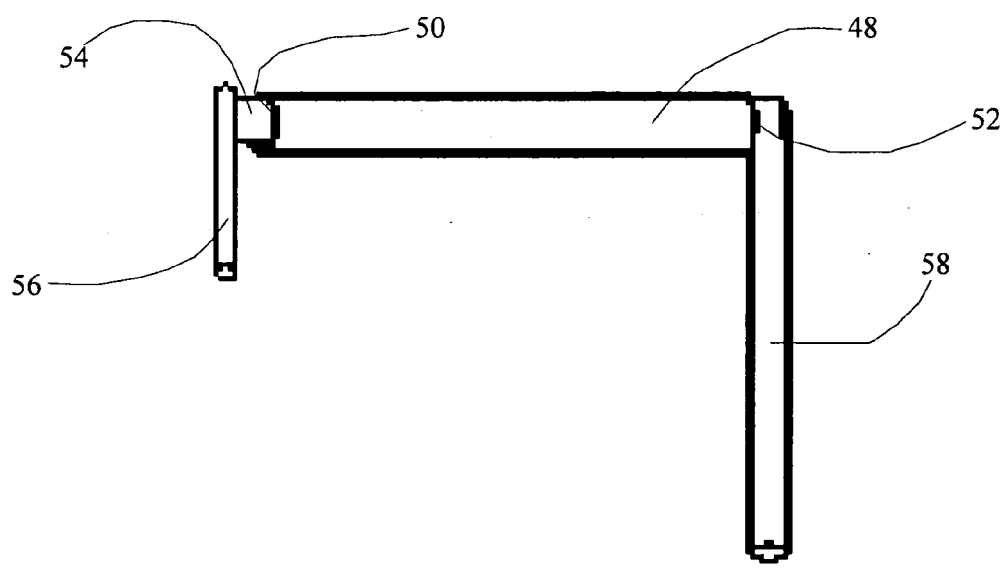
FIG. 4 is a side perspective view of the horizontal cylindrical rod inserted into the horizontal tubing.
Figure 6:
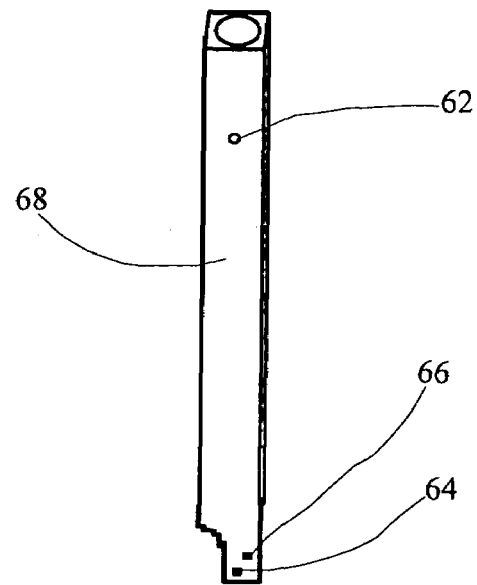
FIG. 6 is a side perspective view of the vertical tubing.

Referring to FIGS. 3 and 4, that portion of the cylindrical rod 54 extending beyond the second open end 52 of the horizontal tubing 48 is bent to a ninety degree angle so as to result in that portion of the cylindrical rod 54 being maintained as a vertical cylindrical rod 58. Referring to FIGS. 5 and 6, the vertical cylindrical rod 58 is inserted into a section of vertical tubing 60. The vertical tubing 60 can be moved up or down the vertical cylindrical rod 58 for proper placement of the wiper on the windshield. Once the proper placement of the vertical tubing 60 is determined, the vertical tubing 60 is temporarily attached to the cylindrical rod 54 with a set screw 62. A side of the vertical tubing 60 near its bottom end is removed for the placement of circular openings 64 and a first spring retainer 66.

Figure 7:
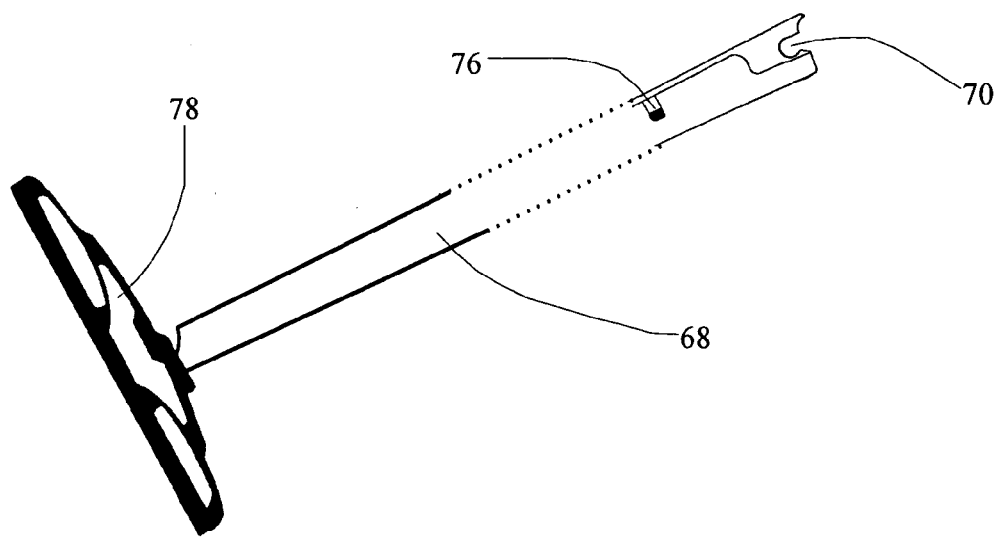
FIG. 7 is a side perspective view of the wiper arm with an attached wiper blade.
Figure 8:
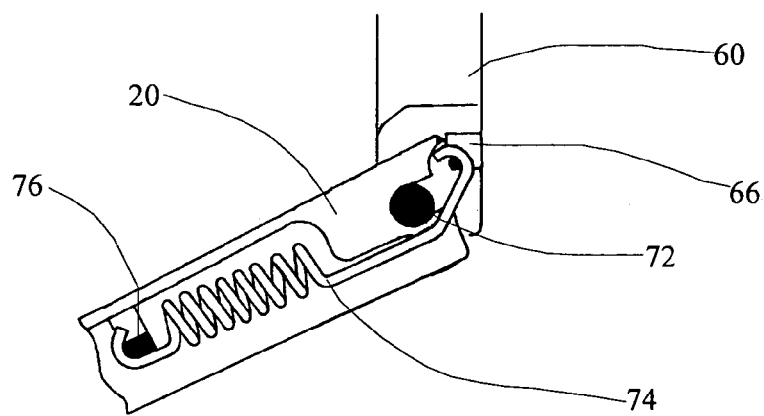
FIG. 8 is an exploded side perspective view of the spring and pin for rotatably connecting the vertical tubing and the wiper arm.

Referring to FIGS. 7 and 8, rotatably connected to the bottom end of the vertical tubing 60 is a wiper arm 68. A cross section of the wiper arm 68 is formed in shape of a square whose top side is opened. A top end of the wiper arm 68 is provided with a second spring retainer 76 and a U shaped notch 70 into which a holding pin 72 is inserted. The holding pin 72 is also inserted into the circular openings 64 of the vertical tubing 60. In a state that the holding pin 72 is fitted in the notch 70 and circular openings 64, a spring (expansion coil spring) 74 for biasing the wiper arm 68 is retained between the first spring retainer 66 and the second spring retainer 76. The wiper arm 68 is connected to the holding pin 72 to rotate about an axis thereof in a direction away from the windshield glass. A line connecting the spring retainers 66 and 76 is positioned beneath the holding pin 72 so that the wiper arm 68 is biased toward the windshield glass. Removably attached to the bottom end of the wiper arm 68 is a wiper blade 78.

A washer fluid line (not illustrated) can be attached to the cylindrical rod 54, vertical rod 58 and placed inside the vertical tubing 60 and wiper arm 68 so as to allow the operator to clean the windshield glass.

Upon the wiper assembly 20 being properly attached to the windshield frame, the operator can simply turn the handle 56 to utilize the wiper blade 78 to clean the windshield glass. If the user desires to remove the wiper assembly 20, the user simply loosens the clamp cylinder 38 by rotating the cylinder handle 40 and removes the wiper assembly from the windshield frame.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A removable and portable manually operated windshield wiper assembly comprising:
    a clamp assembly for temporarily attaching the windshield wiper assembly to the top end of a windshield or the frame of a windshield;
    a section of horizontal tubing maintained within the clamp assembly;
    a cylindrical rod inserted into and extending beyond the horizontal tubing ends;
    a handle attached to the first end of the cylindrical rod;
    a ninety degree angle in the cylindrical rod resulting in a portion of the cylindrical rod being vertical;
    a portion of the vertical cylindrical rod is movably inserted into a section of vertical tubing; and
    a wiper arm whose one end is movably attached to the vertical tubing and whose other end is removably connected to a wiper blade.

2. A removable and portable manually operated windshield wiper assembly as claimed in claim 1 in which the clamp assembly is comprised of:
    a first side segment and a second side segment, spanned by an intermediate frame segment;
    a horizontal cylindrical opening passing through the intermediate frame segment the threaded clamp cylinder which is threaded into engagement with corresponding internal threads of a cylinder opening, provided in the first side segment;
    a cylinder grip attached to the first end of the clamp cylinder to facilitate rotation of the clamp cylinder;
    a clamp nut attached to the second end of the clamp cylinder; and
    a spring pad attached to the clamp nut.

3. A removable and portable manually operated windshield wiper assembly as claimed in claim 1 in which the vertical tubing can be moved up or down the vertical cylindrical rod for proper placement of the wiper on the windshield and then temporarily attached to the cylindrical rod with a set screw.

4. A removable and portable manually operated windshield wiper assembly as claimed in claim 1 in which the bottom end side of the vertical tubing is removed for the placement of circular openings for inserting a holding pin and a spring retainer.

5. A removable and portable manually operated windshield wiper assembly as claimed in claim 1 in which the wiper arm includes a spring retainer and a U shaped notch for the insertion of a holding pin.

6. A removable and portable manually operated windshield wiper assembly as claimed in claim 5 in which a spring is attached to the spring retainer.

7. A removable and portable manually operated windshield wiper assembly comprising:
    a clamp for attaching the wiper assembly to the top side of a windshield having a first side segment and a second side segment, spanned by an intermediate frame segment, a horizontal cylindrical opening passing through the intermediate frame segment, a threaded clamp cylinder which is threaded into engagement with corresponding internal threads of a cylinder opening, provided in the first side segment, a cylinder handle attached to the first end of the clamp cylinder to facilitate rotation of the clamp cylinder, a clamp nut attached to the second end of the clamp cylinder, and a spring pad attached to the clamp nut;
    a wiper blade assembly having a section of horizontal tubing maintained within the clamp assembly, a cylindrical rod inserted into and extending beyond the horizontal tubing ends, a handle attached to the first end of the cylindrical rod, a ninety degree angle in the cylindrical rod resulting in a portion of the cylindrical rod being vertical, the vertical cylindrical rod being movably inserted into a section of vertical tubing, and a wiper arm rotatably attached at one end to the vertical tubing and whose other end is removably connected to a wiper blade.

8. A removable and portable manually operated windshield wiper assembly as claimed in claim 7 in which the clamp cylinder can be tightened so as to securely fasten the wiper assembly to the windshield.

9. A removable and portable manually operated windshield wiper assembly as claimed in claim 7 in which a clamp nut spring pad and a seat pad protect the windshield from damage when tightening the clamp cylinder.

10. A removable and portable manually operated windshield wiper assembly as claimed in claim 7 in which the vertical tubing can be moved up or down the vertical cylindrical rod for proper placement of the wiper on the windshield and then temporarily attached to the cylindrical rod with a set screw.

* * * * *